US012754768B2

(12) United States Patent
Bhargava

(10) Patent No.: US 12,754,768 B2
(45) Date of Patent: Oct. 6, 2026

(54) DYNAMIC LEARNING BASED RESOURCE UTILIZATION FAIRNESS IN A CLOUD MULTI-TENANT ENVIRONMENT

(71) Applicant: SAP SE, Walldorf (DE)

(72) Inventor: Apoorv Bhargava, Bangalore (IN)

(73) Assignee: SAP SE, Walldorf (DE)

( * ) Notice: Subject to any disclaimer, the term of this patent is extended or adjusted under 35 U.S.C. 154(b) by 431 days.

(21) Appl. No.: 18/483,472

(22) Filed: Oct. 9, 2023

(65) Prior Publication Data

US 2025/0117254 A1 Apr. 10, 2025

(51) Int. Cl.
*G06F 9/50* (2006.01)

(52) U.S. Cl.
CPC .......... *G06F 9/5016* (2013.01); *G06F 9/5072* (2013.01)

(58) Field of Classification Search
CPC ...... G06F 9/5072; G06F 9/5016; G06F 9/505; G06N 20/00
See application file for complete search history.

(56) References Cited

U.S. PATENT DOCUMENTS

| | | | | |
|---|---|---|---|---|
| 9,892,066 | B1 * | 2/2018 | Dodson | G06F 3/0653 |
| 11,360,821 | B1 * | 6/2022 | Dey | G06F 9/505 |
| 2017/0131936 | A1 * | 5/2017 | Parra | G06F 3/0673 |

OTHER PUBLICATIONS

Extended European Search Report issued in European Application No. 24199496.1-1203 mailed Mar. 6, 2025, 14 pages.

* cited by examiner

*Primary Examiner* — Eric Cardwell
(74) *Attorney, Agent, or Firm* — Mintz Levin Cohn Ferris Glovsky and Poneo. P.C.

(57) ABSTRACT

A system for executing a multi-tenant application includes at least one processor and at least one memory storing program instructions. The multi-tenant application generates one or more page size recommendations and one or more sequential request count recommendations for one or more calls to an external database. The multi-tenant application performs a first call to the external database using a page size which is based on a first page size recommendation, where the page size specifies a number of records to retrieve from the external database. The multi-tenant application also performs, in a sequential manner by the multi-tenant application, the first call and a number of subsequent calls to the external database, where the number of subsequent calls is based on a first sequential request count recommendation. Related methods and computer program products are also provided.

19 Claims, 13 Drawing Sheets

405

| Job Run | Job Run Start Time | Job Run End Time | Status | Number of Documents Available at Source System | Number of Documents Processed |
|---|---|---|---|---|---|
| 1 | 01-01-2023 08:00:00 | 01-01-2023 08:04:01 | Success | 1225 | 1225 |
| 2 | 01-01-2023 08:05:00 | 01-01-2023 08:05:20 | Success | 12 | 12 |
| ⋮ | ⋮ | ⋮ | ⋮ | ⋮ | ⋮ |

410

| Job Run | Job Run Start Time | Job Run End Time | Status | Number of Documents Available at Source System | Number of Documents Processed |
|---|---|---|---|---|---|
| 1 | 01-01-2023 08:00:00 | 01-01-2023 08:00:30 | Success | 21 | 21 |
| 2 | 01-01-2023 08:05:00 | 01-01-2023 08:05:20 | Success | 10 | 10 |
| ⋮ | ⋮ | ⋮ | ⋮ | ⋮ | ⋮ |

415

| Job Run | Job Run Start Time | Job Run End Time | Status | # of Docs Available at Source System | # of Docs Processed |
|---|---|---|---|---|---|
| 1 | 01-01-2023 08:00:00 | | Waiting | 21 | 0 |
| 2 | 01-01-2023 08:05:00 | | Waiting | 21 | 0 |
| 3 | 01-01-2023 08:10:00 | 01-01-2023 08:12:10 | Success | 21 | 21 |
| 4 | 01-01-2023 08:15:00 | | Waiting | 10 | 0 |
| 5 | 01-01-2023 08:20:00 | | Waiting | 25 | 0 |

FIG. 4

| Average Data Size per Trigger | Subscriber Category | Subscribed Plan | Month of the Year (1 to 12) | Day of the Week (1 to 7) | Hour of the Day (1 to 24) | # of Active Customers | Resource Availability | Latest Response Time from Backend System | Label – Recommended Page Size Value | Label – Recommended Sequential Request Count |
|---|---|---|---|---|---|---|---|---|---|---|
| 51 | Small | Standard | 2 (February) | 1 (Monday) | 23 | 5 | Low | 500 milliseconds / record | 10 | 1 |
| 210 | Medium | Standard | 1 (January) | 1 (Monday) | 23 | 5 | Medium | 200 milliseconds / record | 100 | 5 |
| 450 | Big | Premium | 12 (December) | 1 (Monday) | 23 | 5 | High | 100 milliseconds / record | 500 | 10 |

505

FIG. 5A

510

| Rule ID | Rule Condition | Recommended Page Size Value | Recommended Sequential Request Count |
|---|---|---|---|
| 1 | Hour of the Day > 8 AND Hour of the Day < 20 | 100 | 5 |
| 2 | Hour of the Day < 8 OR Hour of the Day > 20 | 200 | 10 |
| 3 | Customer Plan = "Premium" | 200 | 20 |

FIG. 5B

DYNAMIC LEARNING BASED RESOURCE UTILIZATION FAIRNESS IN A CLOUD MULTI-TENANT ENVIRONMENT

TECHNICAL FIELD

The present disclosure generally relates to cloud computing.

BACKGROUND

In a cloud computing environment, multiple tenants can be served by a shared pool of computing resources including, for example, computer networks, servers, storage, applications, services, and/or the like. A tenant can be any entity that requires a secure and exclusive computing environment implemented using the shared pool of computing resources. As such, the multi-tenant cloud computing environment may isolate identity and access management across different tenants as well as segregate tenant-specific data and resources.

SUMMARY

In some implementations, a system includes at least one processor and at least one memory including program instructions which when executed by the at least one processor causes various operations. These operations include generating, by a multi-tenant application, one or more page size recommendations and one or more sequential request count recommendations for one or more calls to an external database. The operations also include performing, by the multi-tenant application, a first call to the external database using a page size which is based on a first page size recommendation, wherein the page size specifies a number of records to retrieve from the external database. The operations further include performing, in a sequential manner by the multi-tenant application, the first call and a number of subsequent calls to the external database, wherein the number of subsequent calls is based on a first sequential request count recommendation.

In some implementations, the program instructions are further executable by the at least one processor to cause operations by the system including generating the first page size recommendation based on a plurality of inputs, the plurality of inputs comprising at least a real-time status of the cloud platform and a subscription plan of a corresponding client. These operations also include training a machine learning engine with performance data of the cloud platform.

In some variations, the program instructions are further executable by the at least one processor to cause operations by the system including combining the first page size recommendation with a ruleset-based page size value to generate the page size; and determining in which fairness mode to operate in based on one or more conditions, wherein the fairness mode sets weighting factor values for applying to the first page size recommendation and the ruleset-based page size value when being combined to generate the page size.

In some variations, the program instructions are further executable by the at least one processor to cause operations by the system including incrementing the fairness mode in response to detecting a first condition. Also, the program instructions are further executable by the at least one processor to cause operations by the system including increasing a first weighting factor applied to the first page size recommendation in response to the fairness mode being incremented. Still further, the program instructions are further executable by the at least one processor to cause operations by the system including decrementing the fairness mode in response to detecting a second condition, wherein decrementing the fairness mode causes an increase to a second weighting factor applied to the ruleset-based page size value, and wherein decrementing the fairness mode causes a decrease to the first weighting factor. In some implementations, the first condition is detecting that a threshold number of clients are experiencing relatively low levels of throughput, and the second condition is detecting that one or more clients with a premium subscription plan have a relatively large number of unprocessed jobs.

In some variations, the multi-tenant application executes on a cloud platform. Also, in some variations, the program instructions are further executable by the at least one processor to cause operations by the system including dynamically generating the first page size recommendation and the first sequential request count recommendation for the first call to the external database in response to a scheduled job or a detected event, wherein the first page size recommendation and the first sequential request count recommendation are generated based on a subscription plan of a corresponding client, a real-time status of the cloud platform, and a real-time status of the external database. In some implementations, the first call and the number of subsequent calls are performed to the external database for a single client by the multi-tenant application without any intervening calls being made to the external database by the multi-tenant application for any other clients.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 4 illustrates examples of monitoring tool tables, in accordance with some example implementations of the current subject matter;

FIG. 5A illustrate an examples of a table for training a machine learning model and FIG. 5B illustrates an example of static configuration ruleset table, in accordance with some example implementations of the current subject matter;

DETAILED DESCRIPTION

Figure 1:
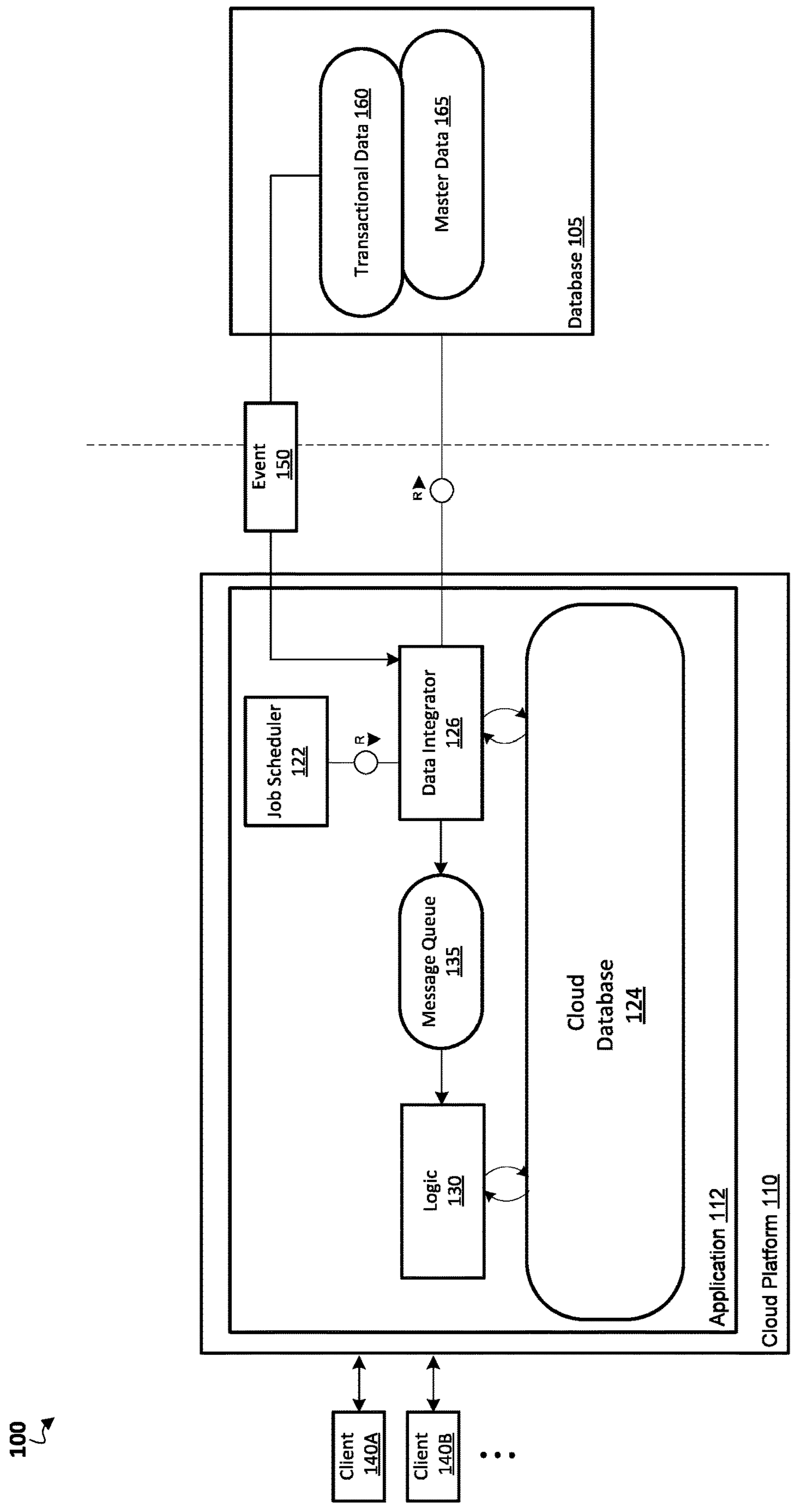
FIG. 1 illustrates an example of a cloud platform, in accordance with some example implementations of the current subject matter.

For a multi-tenant cloud application operating on a cloud system, unbalanced data load generation from a particular subscriber or a particular subset of subscribers can cause problems. One approach to address the load generation problem in the context of a data integration use case is to set a fixed page size for outbound data requests. As used herein, the term "page size" refers to the number of records that are fetched in a single request by application from a database external to the system. It is noted that the term "page size" may also be referred to herein as "record fetch size". For example, the outbound data requests are calls to an external HTTP service and/or the outbound data requests are calls to an external REST service. The appropriate fixed record fetch size can be decided based on testing, experience, and/or the like. Additionally, new updated data (e.g., the changes since the last load operation) are loaded fully for a subscriber tenant once a job or event triggers the data load process for the subscriber tenant. In a scenario, this is achieved by sending read requests, with the fixed record fetch size, one by one until there is no remaining data available at the external database. However, when the data is being loaded by a given subscriber tenant, the other subscriber tenants are waiting in queue for their turn. This can lead to data starvation for the other subscriber tenants. In essence, what this means is that in a multi-tenant cloud services platform with one deployment at the provider serving many tenants with the same code and resources, the same practice is used assuming that all of the subscribing tenants will have the same requirements and environmental factors. This creates a risk to the cloud services platform of overloading the platform, which can compromise multi-tenant behavior, inhibit performance, and cause underutilization of resources. In some embodiments, there is provided mitigation of one or more of these risk factors (e.g., overloading, starvation) for various contemplated deployments of multi-tenant cloud services platform.

In some embodiments, a solution to mitigate these risk factors is to restrict outbound data requests by generating dynamic page size value recommendations and dynamic request count recommendations. The term "request count" refers to the number of sequential pages that are fetched for a given client before other client's jobs are processed. The page size and request count values may be generated dynamically by a recommendation engine in some embodiments. To "dynamically" generate these recommendations refers to the real-time nature of the generation, such as in response to a scheduled job or in response to an event. Also, the dynamic nature of recommendation generation is due to the recommendations being based on the real-time status of the cloud platform as well as the real-time status of the external database or external system. Additionally, in some cases, the page size value and the request count value that are used to perform the client device's job may also be adjusted based on a ruleset.

FIG. 1 depicts a diagram illustrating an example of a system 100 consistent with implementations of the current subject matter. Referring to FIG. 1, the system 100 may include a cloud platform 110. The cloud platform 110 may provide resources that can be shared among a plurality of tenants. For example, the cloud platform 110 may be configured to provide a variety of services including, for example, software-as-a-service (SaaS), platform-as-a-service (PaaS), infrastructure as a service (IaaS), and/or the like, and these services can be accessed by one or more tenants of the cloud platform 110. In the example of FIG. 1, the system 100 includes a first tenant 140A (labeled client) and a second tenant 140B (labeled client as well), although system 100 may include any number of other tenants. For example, multitenancy enables multiple end-user devices (e.g., a computer including an application) as well as multiple subscribing customers having their own group of end-users with an isolated context of the particular customers to access a given cloud service having shared resources via the Internet and/or other type of network or communication link(s).

The cloud platform 110 may include resources, such as at least one computer (e.g., a server), data storage, and a network (including network equipment) that couples the computer(s) and storage. The cloud platform 110 may also include other resources, such as operating systems, hypervisors, and/or other resources, to virtualize physical resources (e.g., via virtual machines) and provide deployment (e.g., via containers) of applications (which provide services, for example, on the cloud platform, and other resources). In the case of a "public" cloud platform, the services may be provided on-demand to a client, or tenant, via the Internet. For example, the resources at the public cloud platform may be operated and/or owned by a cloud service provider (e.g., Amazon Web Services, Azure, etc.), such that the physical resources at the cloud service provider can be shared by a plurality of tenants. Alternatively, or additionally, the cloud platform 110 may be a "private" cloud platform, in which case the resources of the cloud platform 110 may be hosted on an entity's own private servers (e.g., dedicated corporate servers operated and/or owned by the entity). Alternatively, or additionally, the cloud platform 110 may be considered a "hybrid" cloud platform, which includes a combination of on-premises resources as well as resources hosted by a public or private cloud platform. For example, a hybrid cloud service may include web servers running in a public cloud while application servers and/or databases are hosted on premise (e.g., at an area controlled or operated by the entity, such as a corporate entity).

In various embodiments, the cloud platform 110 provides services to client 140A-B. Each service may be deployed via a container, which provides a package or bundle of software, libraries, configuration data to enable the cloud platform to deploy during runtime the service to, for example, one or more virtual machines that provide the service to client 140A. The service may also include logic (e.g., instructions that provide one or more steps of a process) and an interface. The interface may be implemented as an Open Data Protocol (OData) interface (e.g., HTTP message may be used to create a query to a resource identified via a URI), although the interface may be implemented with other types of protocols including those in accordance with REST (Representational state transfer).

In the example of FIG. 1, there are two databases 124 and 105, although other quantities of databases may be implemented as well. The first database 124 is internal to the cloud platform 110, but the second database 105 is external to the cloud platform 110, so an external REST type call may be used to send queries and receive responses from database 105. For example, when the interface is configured in accordance with REST or the ODATA protocol, the interface may access a data model, such as the client tenant schema associated with client 140A's data at database 105. And, the interface may provide a REST or Open Data Protocol (ODATA) interface to external applications and/or services, which in this case is the database 105. In the case of REST compliant interfaces, the interface may provide a uniform interface that decouples the client and server, is stateless (e.g., a request includes all information needed to process and respond to the request), cacheable at the client side or the server side, and the like. It is noted that database 105 may also be referred to herein as external database 105 or back-end server 105.

To illustrate further, the client 140A may cause execution of a process or job on application 112. For example, an action or a condition at client 140A may cause a message querying or requesting a response from application 112. For example, the process or job may generate a document or a report, such as an invoice, which is returned to the client 140A. In this example, a step of the process may include determining an excise tax for the document or report. When the step requires the determination of the excise tax for example, this may require a query to the database 105 in order to obtain data regarding excise taxes for goods moving from location to location. To that end, data integrator 126 may send a query to the database 105 for excise tax information based on the location associated with the delivery of the product or service, for example. In other words, a REST call is made to an external service, which in this example is database 105. Application 112 may receive a response to the query from the database 105 (where the response includes the requested excise tax information based on the location associated with the delivery of the product or service, for example). The response may be compliant with REST as well. At least a portion of the noted process may execute at logic 130 at the cloud platform 110 (although a portion may execute at the client 140A as well). Alternatively, or additionally, the noted process for generating the document or report may include a service extension. The service extension may represent a modification in the process (e.g., added step(s) and/or deleted step(s)) specific to, or uniquely for, the client 140A. In other words, the service extension may customize at least a portion of the process for the client 140A.

When the external calls for one tenant cause the application 112 to consume too much of the shared resources at the cloud platform 110 and/or database 105, the external calls may affect other tenants, such as the client 140B. In other words, if the jobs from client 140A and/or events (e.g., event 150) corresponding to client 140A consume too much of the processing capacity of the CPUs, memory, network bandwidth, and the like at the cloud platform 110 and/or bandwidth to and other resources of database 105, this consumption can impact the performance of the services provided by the cloud platform 110 to other tenants, such as client 140B and/or the like.

In some embodiments, application 112 generates dynamic page size value recommendations and dynamic request count recommendations for requests to database 105. the page size value may be determined based on a combination of a dynamically recommended page size value, generated by a recommendation engine (e.g. recommender 390 of FIG. 3), and a page size value generated based on a ruleset (e.g., ruleset 510 of FIG. 5B). Similarly, in some embodiments, the request count value is determined based on a combination of the dynamically recommended page size value, generated by the recommendation engine, and a page size value generated based on the ruleset.

In some embodiments, the cloud services platform 110 serves, with the same application instance and common resources, one or more relatively small tenants (e.g., client 140B) as well as one or more relatively large tenants (e.g., client 140A). In other words, the cloud services platform 110 serves a plurality of tenants with the tenants varying in size. One or more of the large tenants can produce millions of transactional records in a day whereas one of more of the small tenants can produce hundreds or less of transactional records in a day. In this example, an intelligent and dynamic record fetch size solution can address one or more of the drawbacks previously mentioned, as well as mitigating various other issues not mentioned herein.

Moreover, it can be challenging to achieve a fair distribution of usage of available resources across subscribing tenants while serving different environments and varying performance requirements of different subscribing tenants without disturbing the stability and quality of the cloud service platform 110. In a multi-tenant cloud environment, a performance issue for one tenant can affect the other tenants as resources are shared.

For example, a large tenant is over-occupying the resources of the multi-tenant cloud service platform 110. In this example, the large tenant has a relatively large record fetch size, and while the cloud service platform 110 is busy servicing the large tenant (and any number of other relatively large tenants), smaller tenants may have to wait longer than expected for their requests to be serviced by the cloud service platform 110. A goal of the cloud service platform 110 is to ensure fair availability of resources to all subscribers. To ensure fair availability of resources, rate limiting can be employed. In some embodiments, rate limiting is implemented based on different criteria. In some embodiment, rate limiting is implemented based on tenants' service plans, current status of resource utilization of cloud service platform 110, and current status of database 105.

In some embodiments, the tenants 140A-B can select from two service options for the service provided by the cloud service platform. It is noted that the term "service option" can also be referred to herein as a "service plan" or a "subscription plan". In some embodiments, the two service options are premium service with a relatively fast processing of requests and a standard service with a relatively moderate throughput for processing of requests. In some embodiments, the tenants 140A-B can select from more than two different service options, and the three or more service options can correspond to varying speeds of processing requests.

As shown in FIG. 1, the application 112 connects to the database 105 and accesses the master data 165 and transactional data 160 to provide extended functionality to the application 112. In some cases, updates occur based on events (e.g., event 150), and the data integrator 126 is responsible for the data replication from the database 105 to the application's database 124. Requests from data integrator 126 to database 105 can be generated in response to jobs or in response to events. When data integrator 126 receives data based on events or based on jobs scheduled by job scheduler 122, data is enqueued in message queue 135 and processed by logic 130.

In some embodiments, when data integrator 126 makes requests to database 105, these requests include a specified page size value and a specified request count. More details on how these recommendations are generated will be discussed in further detail below. The request count is a configurable and/or dynamically recommended parameter specifying how many requests in a row will be processed for a single client or a single user. Each request retrieves a specified number of records, with the specified number of records referred to as the page size. As used herein, the term "record" is defined as a set of data organized together and stored in memory. The set of data can be referred to as a dataset, collection of data, file, document, report, or the like. A record can refer to data having a fixed size, or the record can refer to data that can vary in size.

After a given request with the specified page size and request count is processed, the data integrator 126 will wait for the next job or event, giving an opportunity for other clients to proceed. This ensures that a single client will not be a resource hog, preventing other clients from accessing the platform. In other words, this approach facilitates fairness amongst the multiple clients accessing the multi-tenant application 112 and cloud platform 110.

Depending on the scenario, a first client (e.g., client 140A) may schedule a job or an event may occur which triggers an access to the database 105 for the first client. The recommended page size and request count are dynamically generated and used for this access to the database 105. Then, after the recommended number of records are retrieved, other clients (e.g., client 140B) are allowed to proceed and have their requests serviced by the cloud platform 110. It is noted that clients can also be referred to herein as customers, users, subscribers, or tenants.

In some embodiments, a page size recommendation module is configured to generate a recommended page size and a recommended request count for a given client. In some embodiments, the page size recommendation module collaborates with a performance learner to generate recommendations. The performance learner may be a sub-component that is learning the performance of the cloud platform 110, multi-tenant application 112, and database 105. Also, the performance learner trains a machine learning model associated with the performance of the cloud platform 110, multi-tenant application 112, and database 105. In this example, the performance data is submitted to the machine learning model, allowing the machine learning model to be trained for the generation of recommendations. As a result, the machine learning model is able to generate recommendations for the page size and request count whenever queried by the page size recommender.

In some embodiments, rather than generating a fixed page size value for processing jobs and events, the systems and methods described herein generate dynamic page size value recommendations for processing jobs and events. Similarly, rather than generating a fixed request count value for jobs and events, dynamic request count value recommendations are generated. These dynamic values are generated by learning the performance of the multi-tenant application 112, cloud platform 110, and database 105, and then basing the dynamic values on the learned performance. Also, in some embodiments, these dynamic values are generated with a goal of ensure fairness to all tenants accessing the application 112.

In some embodiments, the dynamic values are generated based at least in part on a static ruleset. In other words, the dynamic values generated by the machine learning model are tuned based on a static ruleset. In some embodiments, a first set of values dynamically generated by the machine learning model are given a first weight and a second set of values generated based on the static ruleset are given a second weight. The first and second sets of values are combined based on the first weighting and the second weighting to generate a final set of values, with the final set of values (e.g., the final page size and the final request count) used by the system for processing the job or event. It should be appreciated that the above concept can be extended to combine three or more sets of values generated based on two or more different machine learning models and/or two or more different rulesets.

In some embodiments, a first ruleset can take into account which hour of the day a job or event is being processed. In this example, the first ruleset can also take into account which day of the week a job or event is being processed. In this embodiment, Mondays may have a certain set of rules which are applied as compared to Saturdays. Additionally, the day of the month may be taken into account, such that the last day of the month (e.g., $31^{st}$ of July) can have a specific set of rules that are applied as compared to a day earlier in the month (e.g., $23^{rd}$ of July). This can pertain to certain customers (e.g., payroll organizations) who tend to generate more jobs at the end of the month for processing.

In some embodiments, balancing the weighting between dynamic recommendation and ruleset generated values is an application level configuration. In some embodiments, the weighting starts out by being balanced at 50% to give an even balance between the dynamic recommendation and the ruleset recommendation. Over time, the weighting can be shifted to other values (e.g., 60% and 40%) for dynamic recommendation and ruleset, and then further shifts in either direction can be made based on monitoring performance, customer feedback, operating conditions, and so on. In some embodiments, adjustments are made in real-time to balance the weighting between dynamic recommendation and ruleset generated values, where the adjustments are generated in response to detected conditions. More details on techniques for making real-time adjustments to the weighting are provided later in this disclosure.

The recommendation module may be a separate service which is used by many different types of applications (e.g., excise tax application, retail application). In these cases, the recommendation module is not part of the multi-tenant application. However, in other cases, the recommendation module is part of the multi-tenant application. In further cases, one or more sub-components of the recommendation module are part of the multi-tenant application, and one or more sub-components are a separate service. Other variations on splitting the recommendation module into multiple components that are located within different platforms, systems, or applications are possible and are contemplated.

Figure 2:
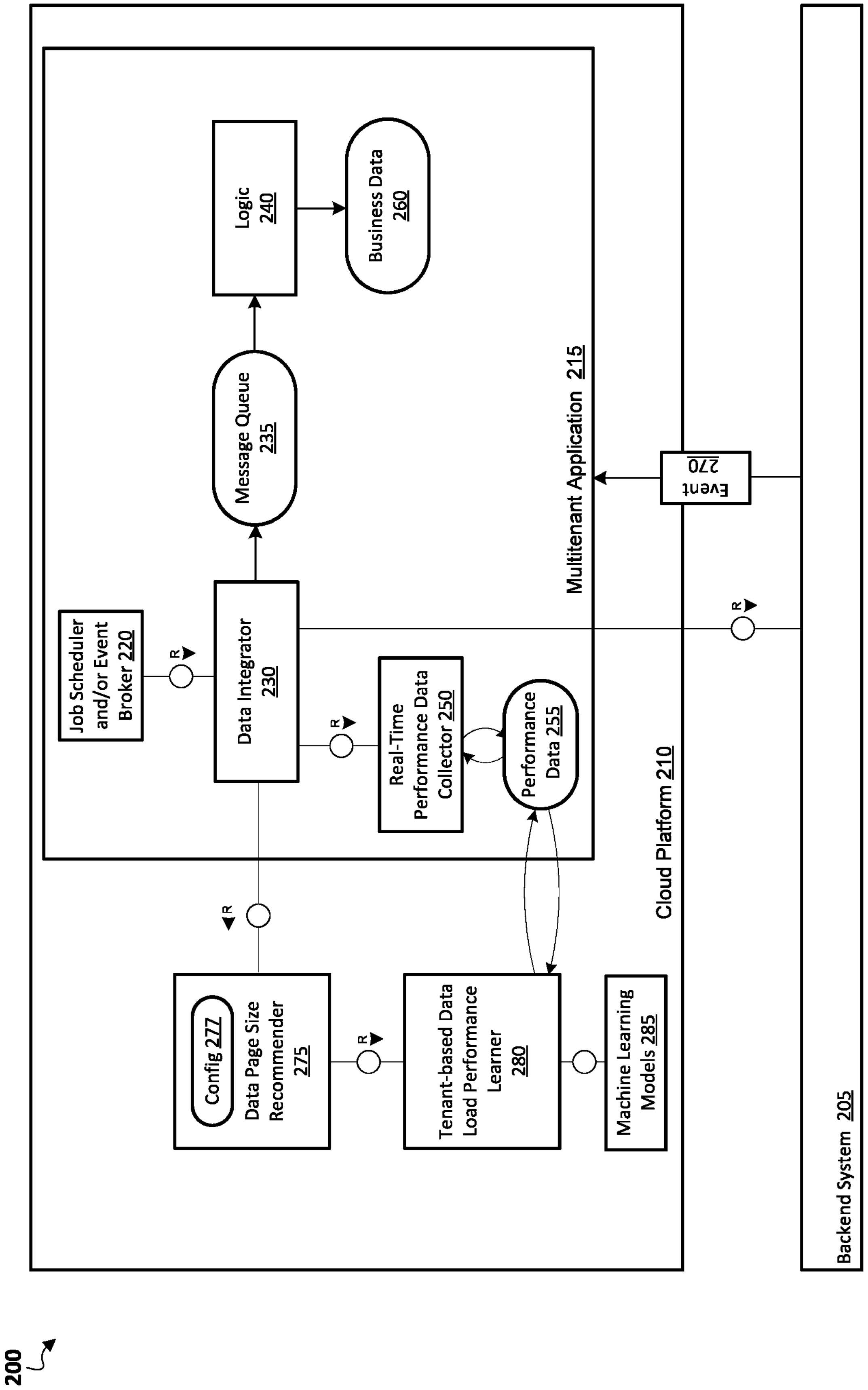
FIG. 2 illustrates another example of a cloud platform, in accordance with some example implementations of the current subject matter.

Turning now to FIG. 2, which depicts another system 200 for implementing the techniques described herein. The system 200 includes at least backend system 205 and cloud platform 210. The system 200 can also include various other components, platforms, servers that are not shown to avoid obscuring the figure. For example, although not shown in FIG. 2, cloud platform 210 can be connected to any number of tenants (e.g., clients 140A-B of FIG. 1). The cloud platform 210 includes multitenant application 215, which is coupled to data page size recommender 275 and tenant-based data load performance learner 280 for generating recommendations. These recommendations are used by data integrator 230 when making requests to backend system 205 on behalf of tenants to ensure fairness for all of the tenants accessing application 215 and cloud platform 210. It is noted that data page size recommender 275 can also be referred to herein as a recommendation module or a recommendation engine, data integrator 230 may be referred to as data integrator module 230, and tenant-based data load performance learner 280 may be referred to as performance learning engine 280 or performance learning module 280.

The data integrator 230 receives jobs or events from job scheduler and/or event broker 220. When the job or event (e.g., event 270) will result in requests being sent to backend system 205, data integrator 230 queries data page size recommender 275 for page size and request count recommendations. The recommended data page size and request count values dynamically generated are used by data integrator 230 when sending requests to backend system 205 to ensure fairness as previously described. When the requested data is returned to data integrator 230 from backend system 205, the data is enqueued in message queue 235, processed by logic 240, and stored as business data 260.

The data page size recommender 275 includes configuration data (or "config") 277 which includes various configuration settings for the operation of data page size recommender 275. In some embodiments, the data page size recommender 275 queries tenant-based data load performance learner 280 for assistance in generating recommendations. A given query from data page size recommender 275 to tenant-based data load performance learner 280 may include at least the subscription plan of the tenant being serviced, the status of cloud platform 210, and the status of backend system 210. These parameters are then provided to machine learning models 285 in order to generate the recommendations for the given tenant. The machine learning models 285 include one or more trained machine learning models for generating page size and request count recommendations. It is noted that while data page size recommender 275, performance learner 280, and machine learning models 285 are shown as being separate from multitenant application 215, this is merely for illustrative purposes. One or more of data page size recommender 275, performance learner 280, and machine learning models 285 may be integrated with application 215 and/or one or more of data page size recommender 275, performance learner 280, and machine learning models 285 may be separate from application 215, depending on the embodiment.

In some embodiments, the given subscription plan of a given tenant is used to select a particular machine learning model 285 of a plurality of machine learning models 285. For example, there is a separate machine learning model 285 for each different possible subscription plan. The given subscription plan of a given tenant is one of the inputs to a single machine learning model 285, with the given subscription plan being used to generate the recommendation(s).

In some embodiments, the machine learning models 285 are trained by performance learner 280 using performance data 255, which is collected by real-time performance data collector 250 during the processing of requests by cloud platform 210 and backend system 205. In some embodiments, the performance data 255 may include parameters such as number of threads available, memory availability, processor availability, number of pending requests, available time slots, page size used, request count used, request duration, response time, and others. Other types of performance data 255 may be collected and used to train machine learning models 285. It is noted that machine learning models 285 can be continuously updated during operation of cloud platform 210 to enhance the recommendations that are made.

In some embodiments, each machine learning model 285 may iteratively train until its configuration (e.g., weights) converges to provide the output, which in this example are the dynamically generated page size and sequential request count values (e.g., the labeled outputs in the last column of Table 505 of FIG. 5A). In the example of FIG. 5A, each machine learning model 285 may be trained using reference or training data (an example of which is depicted in Table 505). Once trained, each machine learning model 285 may be used to provide the dynamically generated page size and sequential request count values based on inputs indicating the state of the resources of the cloud platform 210. Although Table 505 depicts a certain set of data for training, other types of data may be used to train the machine learning model. Moreover, the machine learning model may be implemented as a neural network, although other types of machine learning models may be used as well (e.g., a regression model to predict the page size and request count values). Variations on the above described machine learning model approaches are possible and are contemplated.

Figure 3:
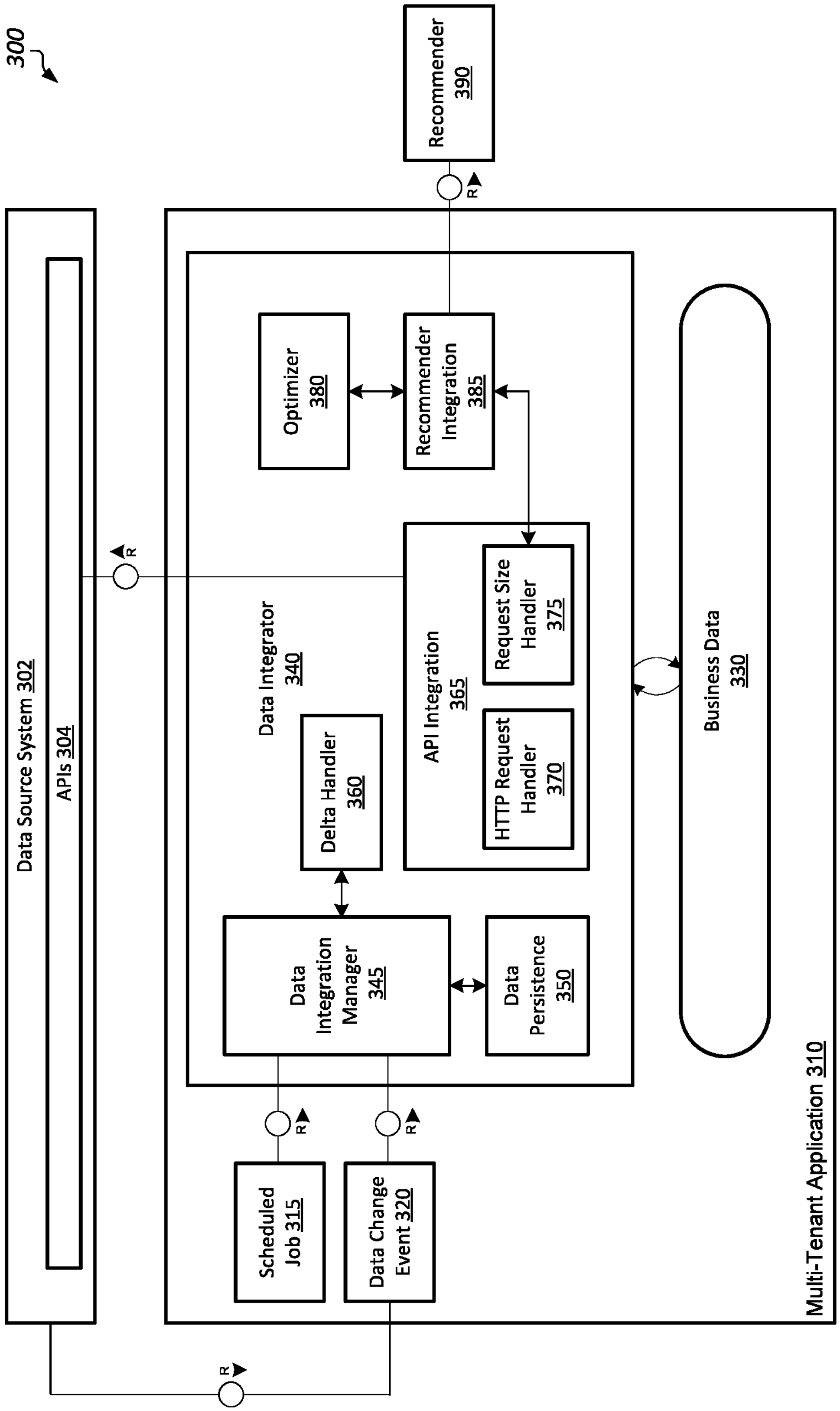
FIG. 3 illustrates a further example of a cloud platform, in accordance with some example implementations of the current subject matter.

Referring now to FIG. 3, a block diagram of an example of a system 300 for implementing one or more learning-based resource utilization fairness techniques for cloud multi-tenant environments is shown. The multi-tenant application 310 is coupled to and interfaces with data source system 302 via application programming interfaces (APIs) 304 for retrieving data associated with client jobs or events. Multi-tenant application 310 provides various services to multiple clients, and multi-tenant application 310 employs strategies for ensuring fairness among the multiple clients who are actively using application 310 and accessing data stored in data source system 302.

The data integrator 340 generates and sends requests to data source system 302 in response to jobs scheduled (e.g., scheduled job 315) for the various clients being serviced. In this example, the data integrator 340 also receives indications of events from data source system 302, such as data change event 320. Data integrator 340 includes data integration manager 345, data persistence module 350, and delta handler module 360 for implementing the functionality for processing scheduled jobs and/or data change events. It is noted that in some implementations, the functionality for implementing data integrator 340 may be partitioned and/or arranged in other suitable manners.

In some embodiments, in order to ensure fairness when processing jobs and events for multiple active clients, the data integrator 340 includes a recommender integration module 385 which interfaces with recommender 390 for generating recommended page size and request count values for the requests sent to data source system 302. These recommended page size and request count values are then used by API integration module 365 for sending the requests to data source system 302. It is noted that recommender 390 may also be referred to as recommendation engine 390. The API integration module 365 includes HTTP request handler 370 and request size handler 375 to generate requests, with the corresponding retrieved data being stored as business data 330.

In some embodiments, the recommender integration module 385 queries recommender 390 to retrieve recommended page size and request count values for a given client. In some embodiments, the recommender integration module 385 provides the subscription plan of the given client as well as the current resource utilization status of a host cloud platform (not shown) as well as the current resource utilization status of data source system 302 to recommender 390. Recommender 390 then uses these inputs to generate the recommended page size and request count values for the given client's job. In some embodiments, outputs generated based on a static ruleset are used in combination with the outputs of the machine learning model(s) to calculate the recommended page size and request count values for the given client's job.

Additionally, the recommender integration module 385 may provide the performance data for processed requests to recommender 390, and the recommender 390 may uses the performance data to train machine learning models which generate the actual recommendations. In some embodiments, the recommender 390 receives performance data from multiple other applications in addition to application 310, and this inter-application performance data is used to train the machine learning models. Depending on the embodiment, the recommender 390 may include one or more of a data page size recommender module, a tenant-based data load performance learner, and machine learning models, or recommender 390 may be coupled to one or more of these components. It is noted that while recommender 390 is shown as a separate module from application 310, it should be understood that this is merely indicative of one particular embodiment. In other embodiments, a portion or the entirety of the functionality of recommender 390 may be integrated with application 310.

In some embodiments, the optimizer 380 works in collaboration with recommender integration module 385 to combine recommended page size and sequential request count values with values generated according to a ruleset, with the combination produced via a weighted formula. For example, the page size that is ultimately used by data integrator 340 is generated by applying a first weighting factor to the recommended page size value and applying a second weighting factor to a ruleset-based page size value. The final page size is equal to the sum of these two products in this example. Similarly, the request count that is ultimately used by data integrator 340 is generated by applying a first weighting factor to the recommended request count value and applying a second weighting factor to a ruleset-based request count value. The final request count would be equal to the weighted average of these two values in this example. It is noted that optimizer 380 may also be referred to as optimization engine 380.

In some embodiments, the optimizer 380 determines in which fairness mode to operate in based on how to balance fairness versus other priorities such as ensuring maximum performance for premium clients. Depending on the implementation, the fairness mode can be set in a variety of different ways. For example, the fairness mode is set to a value in a range of 0-7, with 0 being least fair and 7 being most fair. In other words, a fairness mode of 0 does not take into account fairness when generating page size and request count values while a fairness mode of 7 is designed to ensure fairness among all clients regardless of subscription plan. Optimizer 380 makes adjustments to the fairness mode based on a variety of parameters and signals that are detected during operation. For example, the optimizer 380 monitors the throughput for the clients accessing application 310, and if a threshold number of clients are experiencing relatively low levels of throughput, then optimizer 380 increments the fairness mode. Alternatively, if optimizer 380 detects that one or more premium clients have a relatively large backlog of unprocessed jobs, then optimizer 380 decrements the fairness mode. Other types of conditions can be detected by optimizer 380 to cause adjustments to be made to the fairness mode. Also, feedback from clients can be received by optimizer 380 which can cause the fairness mode to be changed.

In some embodiments, an adjustment to the fairness mode causes changes to the weighting factors $W_{ML}$ and $W_{config}$, with $W_{ML}$ applied to the machine learning-based value and $W_{config}$ applied to the ruleset-based values. These weighting factors are used when combining the machine learning-based values and the ruleset-based values. For example, the changing the weighting factors causes the dynamically generated page size and sequential request count values to skew more toward either the machine learning recommendations or the ruleset-based values. For example, if the fairness mode is incremented, the weighting factor $W_{ML}$ is increased and the weighting factor $W_{config}$ is decreased to give greater weight to the machine learning recommendations. Alternatively, if the fairness mode is decremented, the weighting factor $W_{ML}$ is decreased and the weighting factor $W_{config}$ is increased to give greater weight to the ruleset-based values.

Turning now to FIG. 4, examples of monitoring tool tables in accordance with various embodiments described herein are shown. A cloud multi-tenant application provides functionality for a customer to monitor in real-time the continuous processing of their documents. In some embodiments, the tables of FIG. 4 provide examples of what is visible to a tenant, with the tables showing monitored data about the current tenant that is in use or in session. These tables may be shown in a user interface of an application monitoring tool. The monitoring tool gives real-time measurements of the performance of the data processing for the customer. For example, the monitor gives measurements of how many documents the application is able to process every five minutes. Intervals other than five minutes may be used. Table 405 is an example of what a relatively large customer might view on their monitor. Table 405 includes columns for the job run number, the job run start and end times, the status of the job, the number of documents available at the source system, and the number of documents processed. It should be understood that this is meant as one possible example of what a customer monitor could show.

Variations on table 405 such as other numbers and/or types of columns are possible and are contemplated. In the example of table 405, the average performance is 124 documents processed per minute, which indicates that documents are not kept waiting long at the source system.

Table 410 in the middle of FIG. 4 provides an example of what a relatively small customer might see on their monitor. In the example of table 410, the average performance is 3 documents processed per minute and documents are not kept waiting long at the source system. Table 415 at the bottom of FIG. 4 provides an example of what a relatively small customer might see on their monitor, in the absence of the fairness techniques disclosed herein, as resources could be blocked by relatively large customers. In the example of table 415, fewer than 1 document per minute is processed, and documents are kept waiting a long time at the source system.

Referring now to FIG. 5A, a table for training a regression-based machine learning model is shown. Table 505 represents one example of data that can be used to train a regression-based machine learning model. Each column of table 505 corresponds to a different parameter which is provided to the machine learning model in one particular embodiment. Other parameters may be provided to the machine learning model. Each row of table 505 is associated with a corresponding tenant. While three rows are shown in table 505, corresponding to three tenants, it should be understood that table 505 may have other numbers of rows for other numbers of tenants in other embodiments.

As shown in table 505, the first column specifies the average data size per trigger for different tenants. The first tenant has an average data size per trigger of 51, while the second and third tenants have 210 and 450, respectively. The next column is subscriber category, which represents the relative size of tenant, with small, medium, and big shown for the three rows of table 505. The next column is labeled as the subscriber plan, with standard and premium the two choices of subscriber plan in this example. In other examples, three or more different types of subscriber plans may be utilized. The next three columns correspond to the month of the year, day of the week, and hour of the day. The following column corresponds to the number of active customers. The next two columns specify the resource availability and the latest response time from the backend system. These nine columns represent the inputs which are used, in some embodiments, to continuously train the regression based machine learning model to achieve high performance while also ensuring fairness among tenants.

Based on these inputs, the machine learning model responds with the labels specified in the two rightmost columns of table 505. The first label is the recommended page size and the second label is the recommended sequential request count. These values are then used, at least in part, to determine the final page size and sequential request count values for requests generated when the multi-tenant application accesses the backend system on behalf of tenants.

Table 510 is shown in FIG. 5B, and table 510 includes examples of configurable rules that are part of a ruleset. The ruleset is utilized in combination with dynamically recommended values to calculate the final page size and request count values. The first rule shown in table 510 has a rule condition based on the hour of the day being between 8 and 20 (i.e., between 8 am and 8 pm) and sets the recommended page size value as 100 and the recommended sequential request count as 5. The second rule has a rule condition based on the hour of the day being outside of 8 and 20 and sets the recommended page size value as 200 and the recommended sequential request count as 10. The third rule has a rule condition based on the customer subscription plan being "premium" and sets the recommended page size value as 200 and the recommended sequential request count as 20. It is noted that these three rules are shown for illustrative purposes and are not meant to limit the scope of the number and/or type of rules that can be included within a ruleset. Any number and type of rules can be included in a ruleset, with the ruleset being utilized to tune the dynamically recommended page size and sequential request count values.

In some embodiment, the following formula may be used by optimizer 380 (of FIG. 3) to determine, such as by calculating, the final recommended values: Final value= $((W_{ML}*Value_{ML})+(W_{config}*Value_{config}))/(W_{ML}+W_{config})$. In this formula, $W_{ML}$ is the weighting factor of the machine learning-based value, $Value_{ML}$ is the value recommended by the machine learning model, $W_{config}$ is the weighting factor of the rule-based value, and $Value_{config}$ is the value recommended by the configured rules. In some embodiments, the weighting factors are initially set to 50%, and then these weighting factors are tuned during operation of the multi-tenant application to achieve the desired performance and fairness among tenants. Alternatively, or additionally, other techniques for determining and adjusting the values of the weighting factors may be employed.

Figure 6:
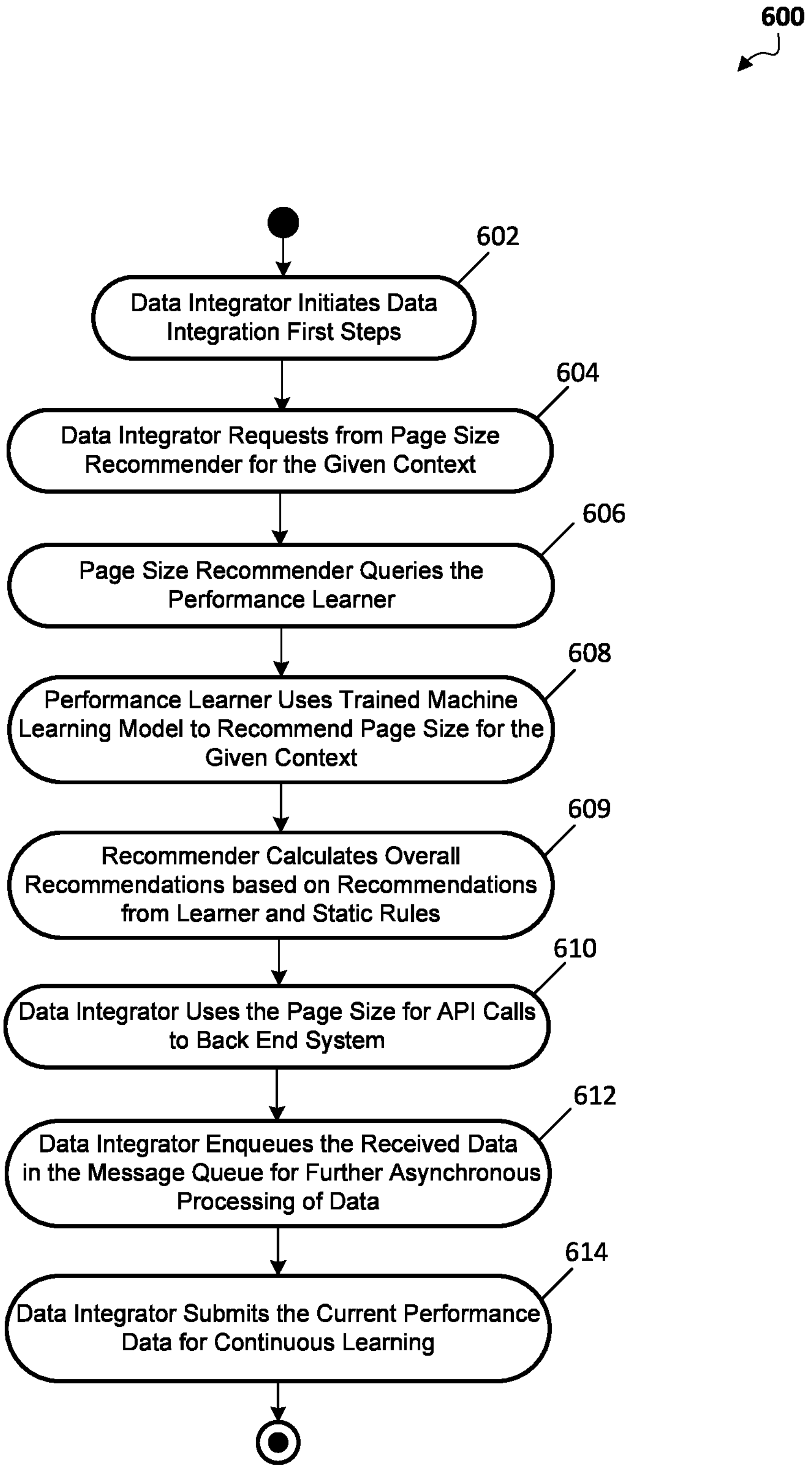
FIG. 6 illustrates an example of a process for continuous learning of page size and request count by a multi-tenant cloud application, in accordance with some example implementations of the current subject matter.

FIG. 6 illustrates a flowchart in accordance with at least some embodiments for implementing a process 600 for continuous learning of page size and request count by a multi-tenant cloud application.

In block 602, the data integrator (e.g., data integrator 126 of FIG. 1) initiates a data integration process, such as a routine. For example, the data integrator initiates the data integration process in response to an event. Alternatively, or additionally, the data integrator initiates the data integration process in response to a scheduled job. Alternatively, or additionally, other actions may cause the data integrator to initiate the data integration process.

Next, in block 604, the data integrator requests dynamically generated page size and request count values from the page size recommender (e.g., data page size recommender 275 of FIG. 2) for the given context. The given context refers to specific operational details regarding the specific tenant who has generated the job or the specific tenant that corresponds to the triggering event as well as system operation conditions. The given context can include parameters such as the subscription plan (e.g., premium, standard), the size of the job, the amount of data to be transferred, the status of the cloud platform, the status of the back-end system, and/or other factors. The status of the cloud platform may include indications of the status of the cloud platform resources, such as an indication of the availability or usage of the CPU(s), the availability or usage of the memory, the availability or usage of the network bandwidth, the availability or usage of the storage, response time to requests, calls, or queries, number of active users, number of active tenants (e.g., virtual machines).

Then, in block 606, the page size recommender queries the performance learner (e.g., performance learner 280 of FIG. 2). In response to the query, the performance learner uses a trained machine learning model (e.g., machine learning models 285 of FIG. 2) to recommend a page size and request count for the given context (block 608). Then, the recommender calculates overall recommendations (for page size and request count) based on recommendations from the performance learner and the static rules (block 609). Next, the data integrator uses the page size and the request count for API calls to the back-end system (e.g., backend system 205 of FIG. 2) (block 610). Then, the data integrator enqueues the received data in the message queue for further asynchronous processing of the data (block 612). Finally, the data integrator submits the current performance data to a performance learner (e.g., performance learner 280) for continuous learning (block 614). After block 614, method 600 may end.

Figure 7:
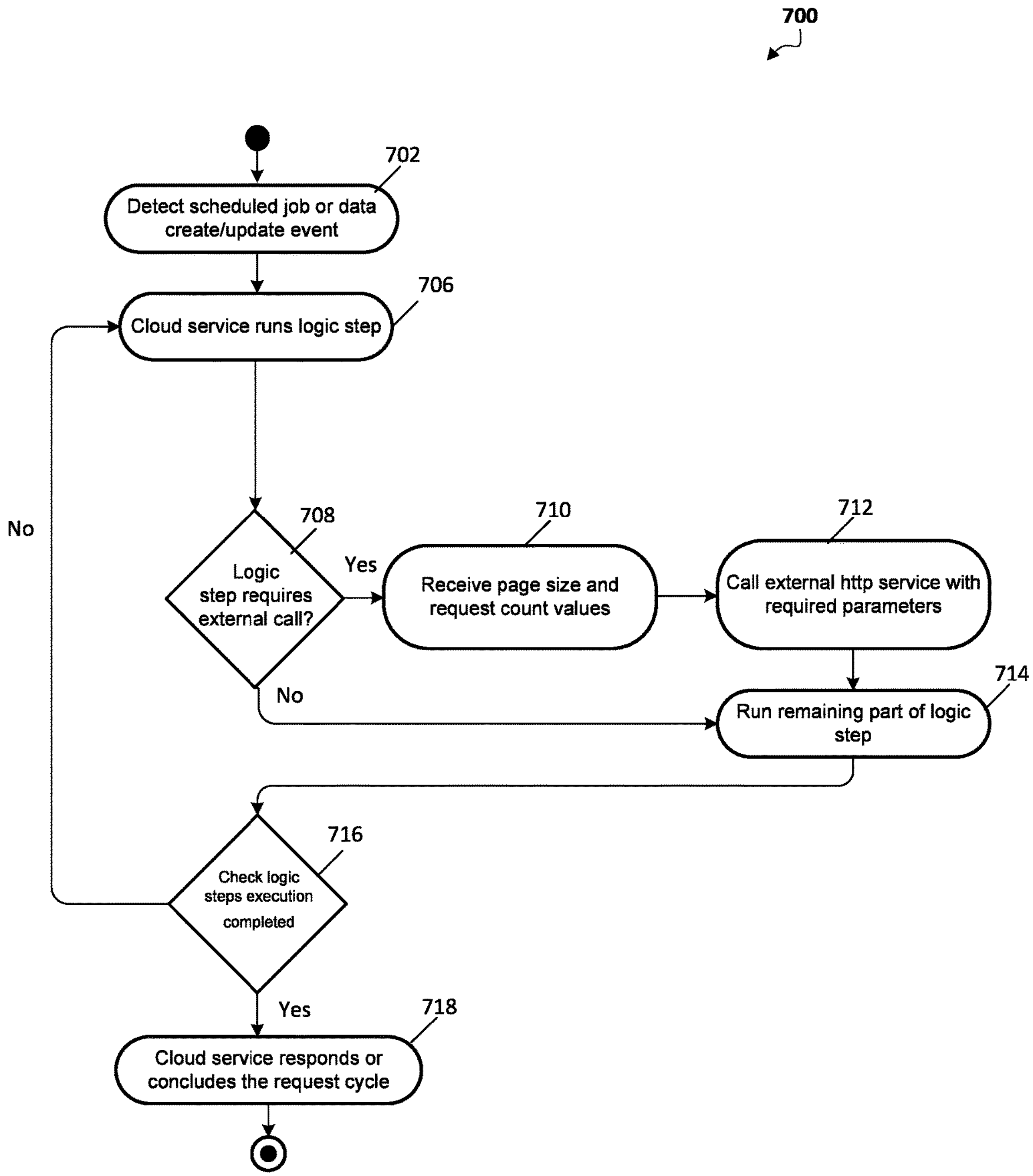
FIG. 7 illustrates an example of a process using dynamically generated page size and request count values, in accordance with some example implementations of the current subject matter.

Referring now to FIG. 7, a process is depicted for using dynamically generated page size and request count values.

At 702, a scheduled job or a data create or update event is detected for a particular client 140A (see, e.g., FIG. 1). For example, a job may be scheduled that requires the generation of a report. In other examples, a data create or update event is triggered based on an action at database 105. Alternatively, or additionally, a process at the client 140A may require a multi-tenant application (e.g., application 112) to perform at least one of the actions or tasks of the process. Alternatively, or additionally, a condition at the client may be satisfied (e.g., a rule of the process being satisfied, time of day condition satisfied) triggering an action. The action may be detected by the client 140A. The detected action may also correspond to any action that requires access, by the application 112 or cloud platform 110, to an external service, such as database 105, such that the access requires an external REST service call (in which case dynamically recommended values may be needed).

In response to detecting the scheduled job or data create or update event, the cloud service (which includes logic 130 for performing at least one action of the process) may initiate execution, at 706, of one or more actions of the process (e.g., one or more logic steps of the logic 130).

As the one or more actions of the process (e.g., one or more logic steps of the logic 130) begin to execute at 706, the cloud service may detect that an external call is required (yes at 708). The call may be considered "external" as the call is external to the cloud service, and in this example to an external database. In some embodiments, the external call (which may be in the form of a message, request, and/or query) is an external REST service call which is in accordance with REST as noted above. For example, the external call (or request) may be via an API, and this external call me be implemented as OData interface, in which case the call may be in the form of an HTTP (or HTTPs) message, such as a GET, that queries the database 105 at the URI.

At 710, the cloud service may receive page size and request count values for the external call. For example, the cloud service may receive page size and request count values from recommender 390 (of FIG. 3). The recommender may determine and/or provide the page size and request count values dynamically based on the subscription plan of the client and on the current state of the resources at the cloud service provider. The cloud service may receive the page size and request count values from the recommender in response to a request to the recommender and/or in response to the detection of the external call. In some embodiments, the recommender may check one or more rules of a ruleset (e.g., from ruleset table 510 of FIG. 5B) to determine whether a rule is triggered that overrides or otherwise modifies the page size and request count values provided by the recommender.

At 712, the external call proceeds to an external service, which in this example is an external REST service database 105, such that the external call uses the dynamically generated page size and request count values provided by the recommender. If the process completes, the cloud service receives, at 714, a response and then continues to run the remaining portion of the process's logic. Referring again to 708, if an external call is not detected in the process's logic flow (No at 708), the cloud service may then run the remaining portion of the process's logic as noted with respect to 714. At 716, the cloud service may check to see if the execution of the service's logic 130 for the process is complete (e.g., the cloud service's portion of the process is complete). If so (Yes at 716), the cloud service may respond, at 718, with a response to the client 140A. This response may provide the requested data, for example. If not (No at 716), the service may return to 706 to execute another step in the process of the logic 130.

Figure 8:
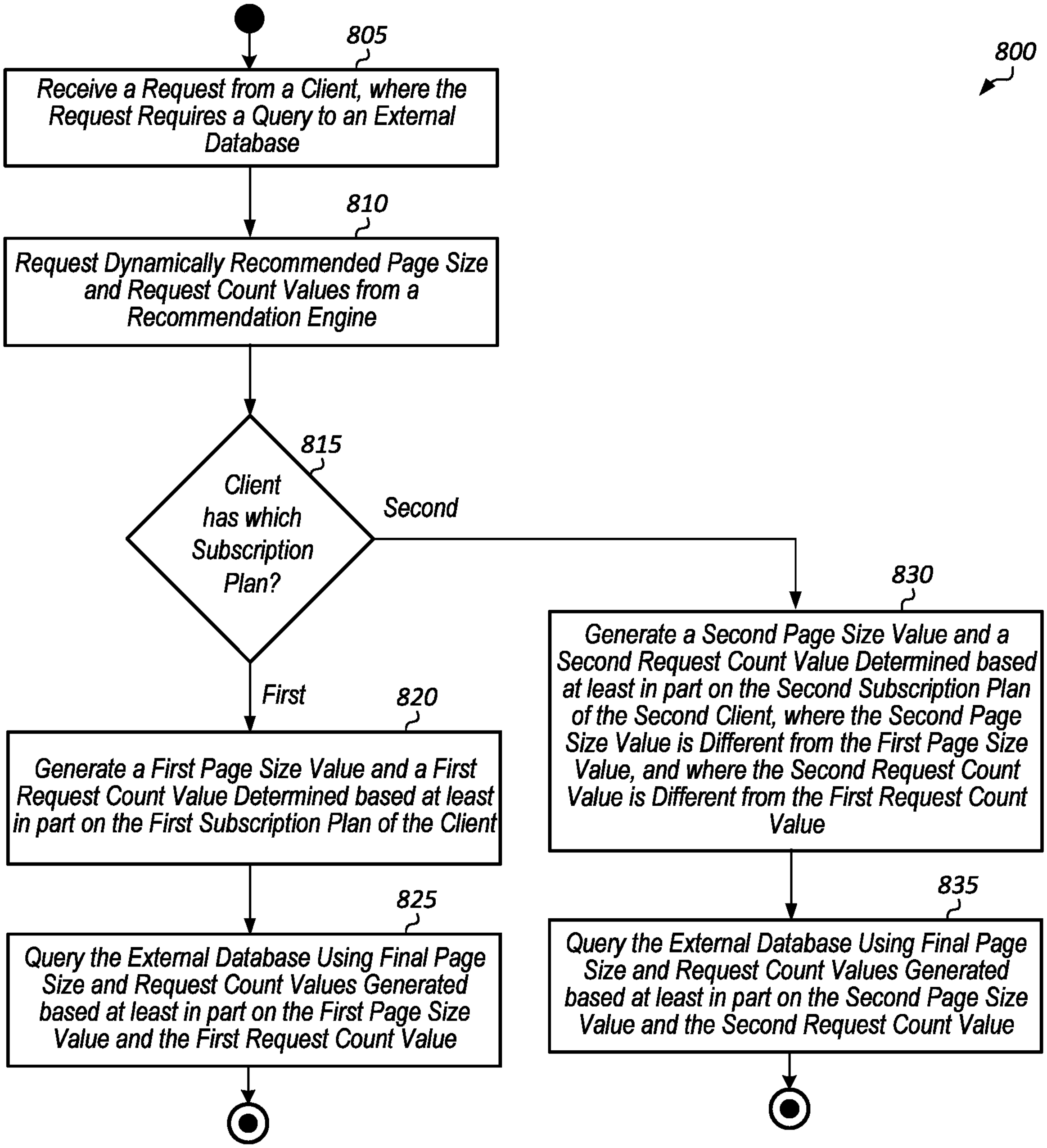
FIG. 8 illustrates an example of a process for generating different page size and request count recommendations based on client subscription plan, in accordance with some example implementations of the current subject matter.

Turning now to FIG. 8, a flow diagram illustrating a process for generating different page size and request count recommendations based on client subscription plan are shown.

A multi-tenant application receives a request from a client, such as client 140A from FIG. 1, where the request requires a query to an external database (block 805). The client may be associated with any number of client devices. The request from the client may be based on a scheduled job or in response to an event being detected. In response to receiving the request that requires the query to the external database, the multi-tenant application, such as application 112 of FIG. 1, requests dynamically recommended page size and request count values from a recommendation engine (block 810). In response to the client having a first subscription plan (e.g., premium subscription plan) (conditional block 815, "first" leg), the recommendation engine, such as recommendation engine 275 of FIG. 2, generates a first page size value and a first request count value determined based at least in part on the first subscription plan of the first client (block 820). It is noted that the values recommended in block 820 can also be determined based on other factors (e.g., state of the cloud platform, state of the external database) in addition to the first subscription plan. Next, the application queries the external database using final page size and request count values that are generated based at least in part on the first page size value and the first request count value, respectively (block 825). In some embodiments, the final page size and request count values are equal to the recommended values (i.e., the first page size value and the first request count value). In some embodiments, the final page size and request count values are calculated using a weighted formula that applies a first weighting factor to the recommended values and a second weight factor to ruleset-based values. After block 825, method 800 may end.

Otherwise, if the client has a second subscription plan (conditional block 815, "second" leg), then the recommendation engine generates a second page size value and a second request count value determined based at least in part on the second subscription plan of the second client, where the second page size value is different from the first page size value, and where the second request count value is different from the first request count value (block 830). It is noted that conditional block 815 can have more than two legs in embodiments where more than two different types of subscription plans are employed. After block 830, the application queries the external database using final page size and request count values that are generated based at least in part on the second page size value and the second request count value, respectively (block 835). After block 835, method 800 may end.

Figure 9:
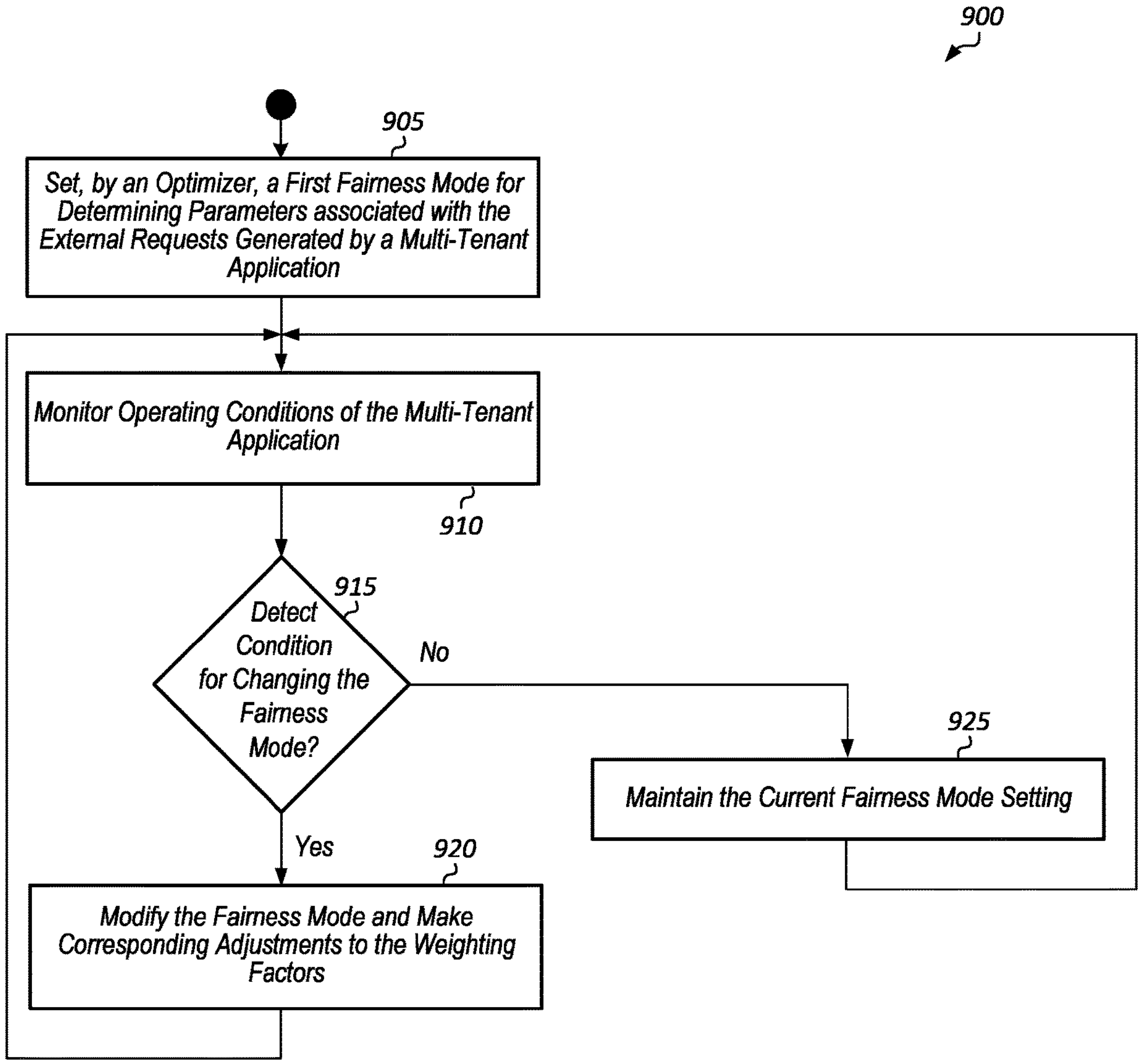
FIG. 9 illustrates an example of a process for an optimizer adjusting a fairness mode based on operating conditions, in accordance with some example implementations of the current subject matter.

Referring now to FIG. 9, a process for an optimizer adjusting a fairness mode based on operating conditions is shown. An optimizer, such as the optimizer 380 of FIG. 3, sets a first fairness mode for determining parameters associated with the external requests generated by a multi-tenant application (e.g., application 310), where the first fairness mode influences the combination of dynamically generated machine learning recommendation values with ruleset-based values (block 905). The optimizer monitors operating conditions of the multi-tenant application (block 910). Depending on the embodiment, the operating conditions being monitored by the optimizer may include one or more of a number of available threads, available memory, available central processing resources, number of active users at the cloud platform, number of active tenants at the cloud platform, number of pending requests, available time slots, record fetch size used, request count used, request duration, response time, and other parameters.

If the optimizer detects a condition for changing the fairness mode (conditional block 915, "yes" leg), then the optimizer modifies the fairness mode and makes corresponding adjustments to the weighting factors used for combining machine-learning recommendation values and ruleset-based values (block 920). Otherwise, if the optimizer does not detect a condition for changing the fairness mode (conditional block 915, "no" leg), then the optimizer maintains the current fairness mode setting (block 925). After blocks 920 and 925, method 900 returns to block 910 with the optimizer continuing to monitor operating conditions.

Figure 10:
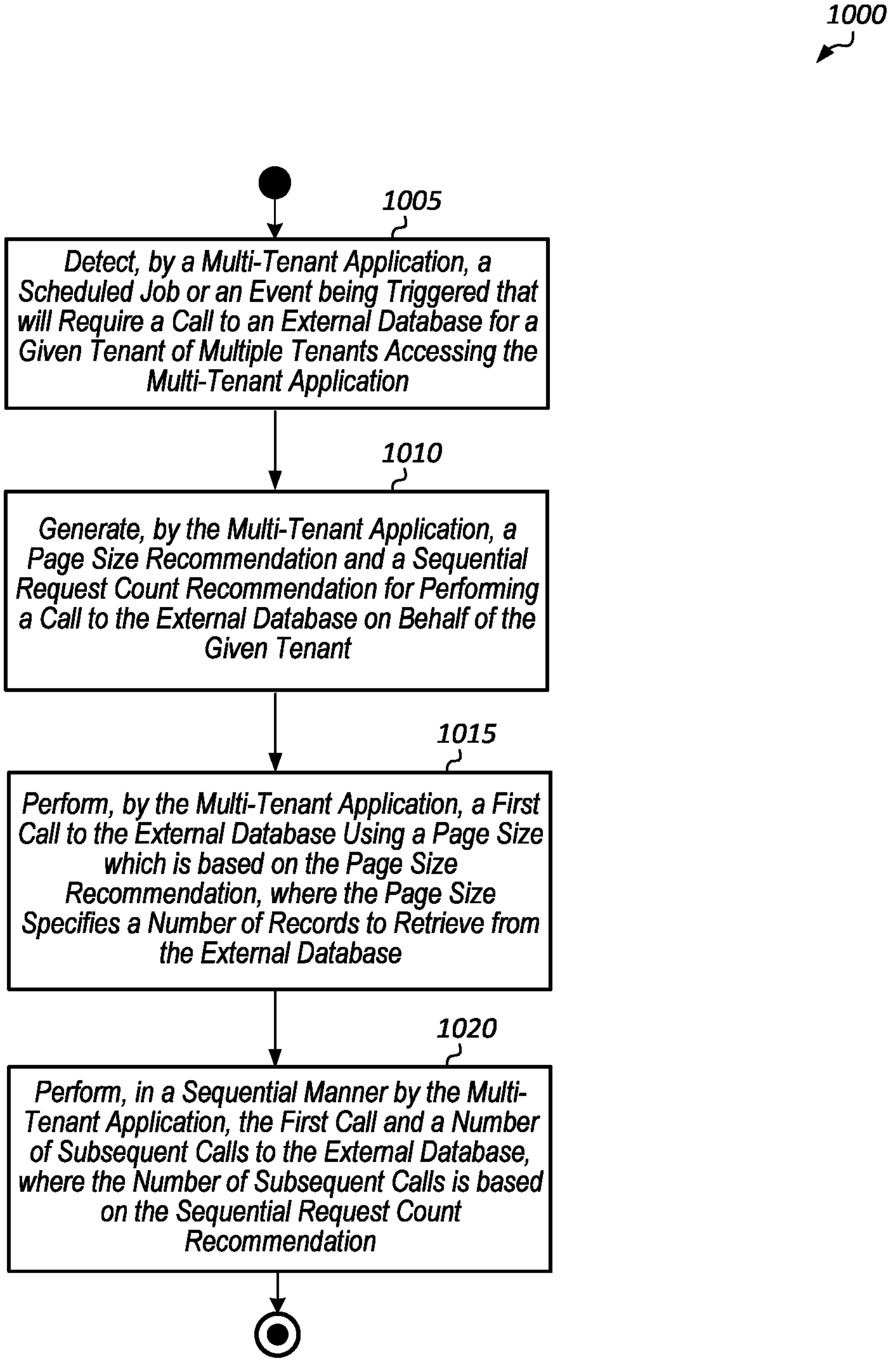
FIG. 10 illustrates an example of a process for dynamically generating page size and sequential request count recommendations, in accordance with some example implementations of the current subject matter.

Turning now to FIG. 10, a process is depicted for dynamically generating page size and sequential request count recommendations. A multi-tenant application detects a scheduled job or an event being triggered that will require a call to an external database for a given tenant of multiple tenants accessing the multi-tenant application (block 1005). Next, in response to the detection, the multi-tenant application generates a page size recommendation and a sequential request count recommendation for performing a call to the external database on behalf of the given tenant (block 1010). In some embodiments, the multi-tenant application generates the first page size recommendation based on a plurality of inputs, the plurality of inputs comprising at least a real-time status of the cloud platform, a real-time status of the external database, and a subscription plan of the given tenant.

Then, after block 1010, the multi-tenant application performs a first call to the external database using a page size which is based on the page size recommendation, where the page size specifies a number of records to retrieve from the external database (block 1015). In some embodiments, the multi-tenant application combines the first page size recommendation with a ruleset-based page size value to generate the page size. Next, the multi-tenant application performs, in a sequential manner, the first call and a number of subsequent calls to the external database, where the number of subsequent calls is based on the sequential request count recommendation (block 1020). In other words, in block 1020, the multi-tenant application performs the first call and the number of subsequent calls to the external database for the given client without any intervening calls being made to the external database by the multi-tenant application for any other clients. After block 1020, method 1000 ends.

Figure 11A:
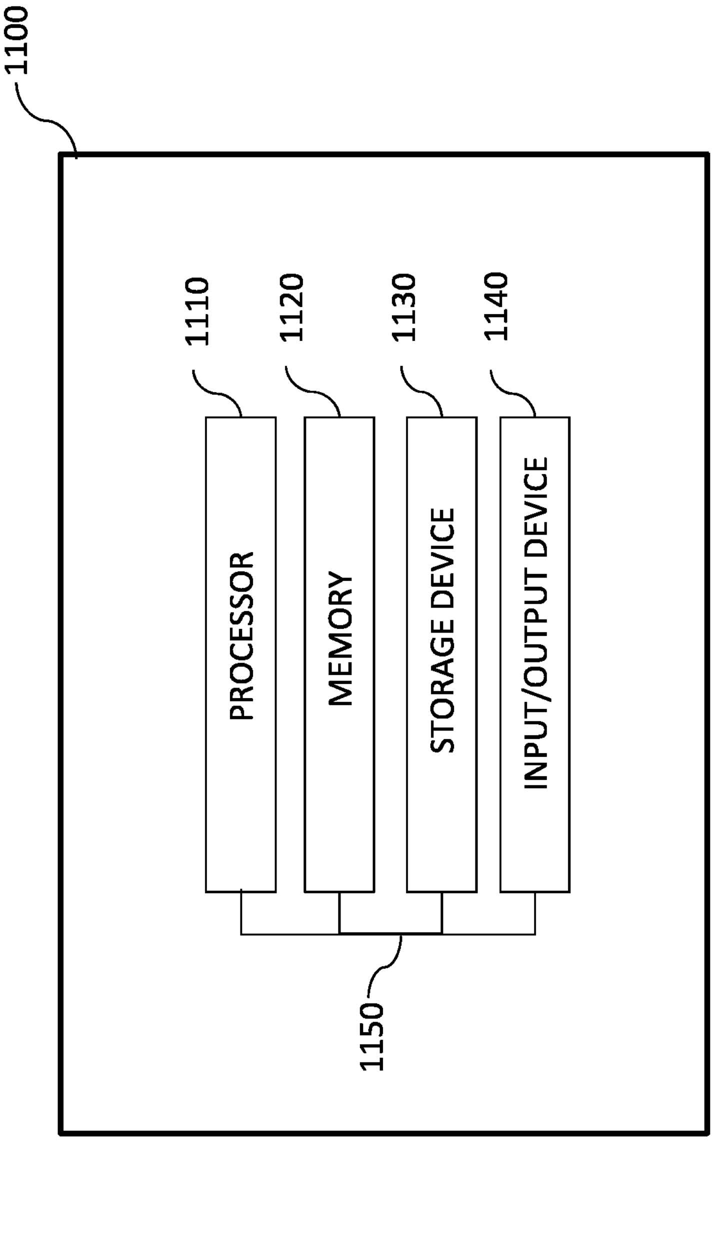
FIG. 11A depicts an example of a system, in accordance with some example implementations of the current subject matter.

In some implementations, the current subject matter may be configured to be implemented in a system 1100, as shown in FIG. 11A. The system 1100 may include a processor 1110, a memory 1120, a storage device 1130, and an input/output device 1140. Each of the components 1110, 1120, 1130 and 1140 may be interconnected using a system bus 1150. The processor 1110 may be configured to process instructions for execution within the system 1100. In some implementations, the processor 1110 may be a single-threaded processor. In alternate implementations, the processor 1110 may be a multi-threaded processor. The processor 1110 may be further configured to process instructions stored in the memory 1120 or on the storage device 1130, including receiving or sending information through the input/output device 1140. The memory 1120 may store information within the system 1100. In some implementations, the memory 1120 may be a computer-readable medium. In alternate implementations, the memory 1120 may be a volatile memory unit. In yet some implementations, the memory 1120 may be a non-volatile memory unit. The storage device 1130 may be capable of providing mass storage for the system 1100. In some implementations, the storage device 1130 may be a computer-readable medium. In alternate implementations, the storage device 1130 may be a floppy disk device, a hard disk device, an optical disk device, a tape device, non-volatile solid state memory, or any other type of storage device. The input/output device 1140 may be configured to provide input/output operations for the system 1100. In some implementations, the input/output device 1140 may include a keyboard and/or pointing device. In alternate implementations, the input/output device 1140 may include a display unit for displaying graphical user interfaces.

Figure 11B:
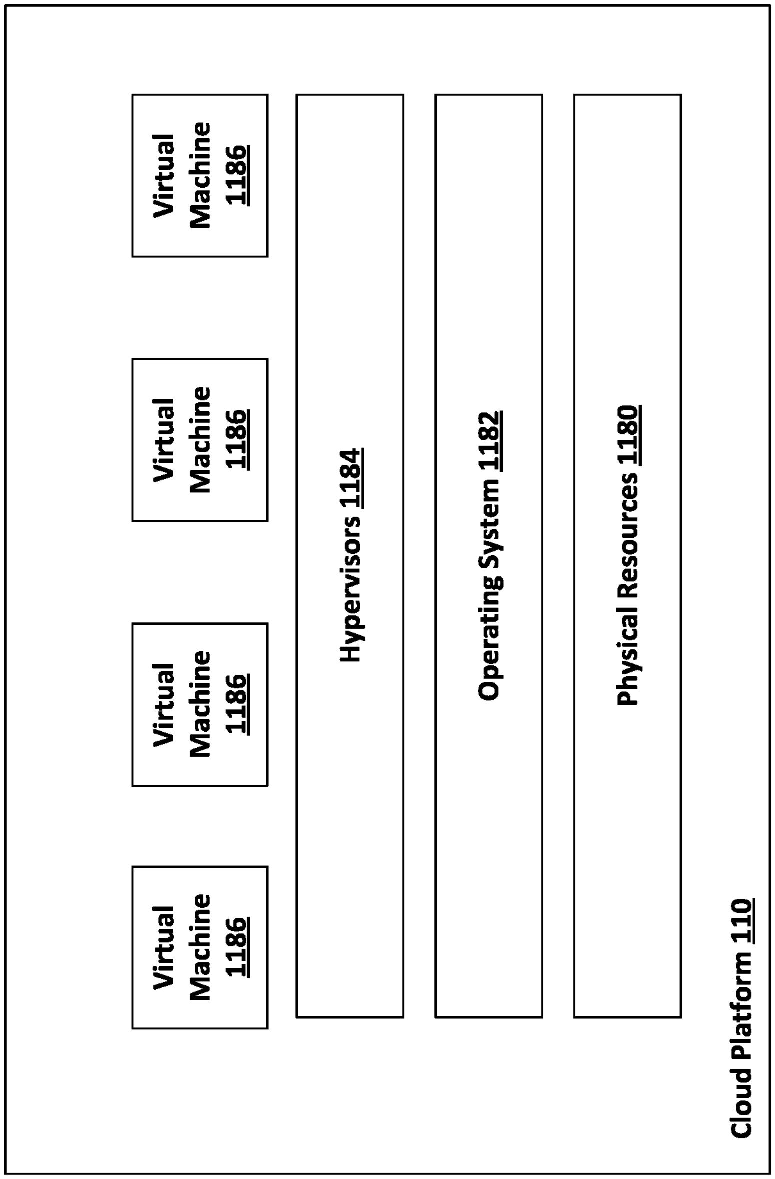
FIG. 11B depicts another example of a system, in accordance with some example implementations of the current subject matter.

FIG. 11B depicts an example implementation of the cloud platform 110, which provided the cloud services. The cloud platform 110 may include physical resources 1180, such as at least one hardware servers, at least one storage, at least one memory, at least one network interface, and the like. The cloud server may also include infrastructure, as noted above, which may include at least one operating systems 1182 for the physical resources and at least one hypervisor 1184 (which may create and run at least one virtual machine 1186). For example, each multitenant application may be run on a corresponding virtual machine.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second and the like can, in some situations, relate to an order; as used in a document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include program instructions (i.e., machine instructions) for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives program instructions as a machine-readable signal. The term "machine-readable signal" refers to any signal used to provide machine instructions and/or data to a programmable processor. The machine-readable medium can store such program instructions non-transitorily, such as for example as would a non-transient solid state memory or a magnetic hard drive or any equivalent storage medium. The machine-readable medium can alternatively or additionally store such machine instructions in a transient manner, such as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising: at least one processor and at least one memory including program instructions executable by the at least on processor. When executed by the at least one processor, the program instructions cause operations including: generating, by a multi-tenant application, one or more page size recommendations and one or more sequential request count recommendations for one or more calls to an external database; performing, by the multi-tenant application, a first call to the external database using a page size which is based on a first page size recommendation, wherein the page size specifies a number of records to retrieve from the external database; and performing, in a sequential manner by the multi-tenant application, the first call and a number of subsequent calls to the external database, wherein the number of subsequent calls is based on a first sequential request count recommendation.

Example 2: The system of Example 1, wherein the operations further comprise generating the first page size recommendation based on a plurality of inputs, the plurality of inputs comprising at least a real-time status of a cloud platform and a subscription plan of a corresponding client; and training a machine learning engine with performance data of the cloud platform Example 3: The system of any one of Examples 1 and 2, wherein the operations further comprise combining the first page size recommendation with a ruleset-based page size value to generate the page size; and determining in which fairness mode to operate in based on one or more conditions, wherein the fairness mode sets weighting factor values for applying to the first page size recommendation and the ruleset-based page size value when being combined to generate the page size.

Example 4: The system of any one of Examples 1 to 3, wherein the operations further comprise incrementing the fairness mode in response to detecting a first condition.

Example 5: The system of any one of Examples 1 to 4, wherein the operations further comprise increasing a first weighting factor applied to the first page size recommendation in response to the fairness mode being incremented.

Example 6: The system of any one of Examples 1 to 5, wherein the operations further comprise decrementing the fairness mode in response to detecting a second condition, wherein decrementing the fairness mode causes an increase to a second weighting factor applied to the ruleset-based page size value, and wherein decrementing the fairness mode causes a decrease to the first weighting factor.

Example 7: The system of any one of Examples 1 to 6, wherein the first condition is detecting that a threshold number of clients are experiencing relatively low levels of throughput, and wherein the second condition is detecting that one or more clients with a premium subscription plan have a relatively large number of unprocessed jobs.

Example 8: The system of any one of Examples 1 to 7, wherein the multi-tenant application executes on a cloud platform.

Example 9: The system of any one of Examples 1 to 8, wherein the operations further comprise dynamically generating the first page size recommendation and the first sequential request count recommendation for the first call to the external database in response to a scheduled job or a detected event, wherein the first page size recommendation and the first sequential request count recommendation are generated based on a subscription plan of a corresponding client, a real-time status of the cloud platform, and a real-time status of the external database.

Example 10: The system of any one of Examples 1 to 9, wherein the first call and the number of subsequent calls are performed to the external database for a single client by the multi-tenant application without any intervening calls being made to the external database by the multi-tenant application for any other clients.

Example 11: A method, comprising: generating, by a multi-tenant application, one or more page size recommendations and one or more sequential request count recommendations for one or more calls to an external database; performing, by the multi-tenant application, a first call to the external database using a page size which is based on a first page size recommendation, wherein the page size specifies a number of records to retrieve from the external database; and performing, in a sequential manner by the multi-tenant application, the first call and a number of subsequent calls to the external database, wherein the number of subsequent calls is based on a first sequential request count recommendation.

Example 12: The method of Example 11, further comprising: generating the first page size recommendation based on a plurality of inputs, the plurality of inputs comprising at least a real-time status of a cloud platform and a subscription plan of a corresponding client; and training a machine learning engine with performance data of the cloud platform.

Example 13: The method of any one of Examples 11 and 12, further comprising: combining the first page size recommendation with a ruleset-based page size value to generate the page size; and determining in which fairness mode to operate in based on one or more conditions, wherein the fairness mode sets weighting factor values for applying to the first page size recommendation and the ruleset-based page size value when being combined to generate the page size.

Example 14: The method of any one of Examples 11 to 13, further comprising: incrementing the fairness mode in response to detecting a first condition.

Example 15: The method of any one of Examples 11 to 14, further comprising: increasing a first weighting factor applied to the first page size recommendation in response to the fairness mode being incremented.

Example 16: The method of any one of Examples 11 to 15, further comprising: decrementing the fairness mode in response to detecting a second condition, wherein decrementing the fairness mode causes an increase to a second weighting factor applied to the ruleset-based page size value, and wherein decrementing the fairness mode causes a decrease to the first weighting factor.

Example 17: The method of any one of Examples 11 to 16, wherein the first condition is detecting that a threshold number of clients are experiencing relatively low levels of throughput, and wherein the second condition is detecting that one or more clients with a premium subscription plan have a relatively large number of unprocessed jobs.

Example 18: The method of any one of Examples 11 to 17, further comprising executing the multi-tenant application on a cloud platform.

Example 19: The method of any one of Examples 11 to 18, further comprising dynamically generating the first page size recommendation and the first sequential request count recommendation for the first call to the external database in response to a scheduled job or a detected event, wherein the first page size recommendation and the first sequential request count recommendation are generated based on a subscription plan of a corresponding client, a real-time status of the cloud platform, and a real-time status of the external database.

Example 20: A non-transitory computer-readable medium storing instructions, which when executed by at least one processor, result in operations comprising: generating, by a multi-tenant application, one or more page size recommendations and one or more sequential request count recommendations for one or more calls to an external database; performing, by the multi-tenant application, a first call to the external database using a page size which is based on a first page size recommendation, wherein the page size specifies a number of records to retrieve from the external database; and performing, in a sequential manner by the multi-tenant application, the first call and a number of subsequent calls to the external database, wherein the number of subsequent calls is based on a first sequential request count recommendation.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A system, comprising:

at least one processor; and at least one memory including program instructions which when executed by the at least one processor causes operations comprising:

generating, by a multi-tenant application, one or more page size recommendations and one or more sequential request count recommendations for one or more calls to an external database;

combining a first page size recommendation with a ruleset-based page size value to generate a page size, wherein the page size specifies a number of records to retrieve from the external database;

determining in which fairness mode to operate in based on one or more conditions, wherein the fairness mode sets weighting factor values for applying to the first page size recommendation and the ruleset-based page size value when being combined to generate the page size;

performing, by the multi-tenant application, a first call to the external database using the page size; and performing, in a sequential manner by the multi-tenant application, the first call and a number of subsequent calls to the external database, wherein the number of subsequent calls is based on a first sequential request count recommendation.

2. The system of claim 1, wherein the program instructions are further executable by the at least one processor to cause operations comprising:

generating the first page size recommendation based on a plurality of inputs, the plurality of inputs comprising at least a real-time status of a cloud platform and a subscription plan of a corresponding client; and training a machine learning engine with performance data of the cloud platform.

3. The system of claim 1, wherein the program instructions are further executable by the at least one processor to cause operations comprising incrementing the fairness mode in response to detecting a first condition.

4. The system of claim 3, wherein the program instructions are further executable by the at least one processor to cause operations comprising increasing a first weighting factor applied to the first page size recommendation in response to the fairness mode being incremented.

5. The system of claim 4, wherein the program instructions are further executable by the at least one processor to cause operations comprising decrementing the fairness mode in response to detecting a second condition, wherein decrementing the fairness mode causes an increase to a second weighting factor applied to the ruleset-based page size value, and wherein decrementing the fairness mode causes a decrease to the first weighting factor.

6. The system of claim 5, wherein the first condition is detecting that a threshold number of clients are experiencing relatively low levels of throughput, and wherein the second condition is detecting that one or more clients with a premium subscription plan have a relatively large number of unprocessed jobs.

7. The system of claim 1, wherein the multi-tenant application executes on a cloud platform.

8. The system of claim 7, wherein the program instructions are further executable by the at least one processor to cause operations comprising dynamically generating the first page size recommendation and the first sequential request count recommendation for the first call to the external database in response to a scheduled job or a detected event, wherein the first page size recommendation and the first sequential request count recommendation are generated based on a subscription plan of a corresponding client, a real-time status of the cloud platform, and a real-time status of the external database.

9. The system of claim 1, wherein the first call and the number of subsequent calls are performed to the external database for a single client by the multi-tenant application without any intervening calls being made to the external database by the multi-tenant application for any other clients.

10. A method comprising:

generating, by a multi-tenant application, one or more page size recommendations and one or more sequential request count recommendations for one or more calls to an external database;

combining a first page size recommendation with a ruleset-based page size value to generate a page size, wherein the page size specifies a number of records to retrieve from the external database;

determining in which fairness mode to operate in based on one or more conditions, wherein the fairness mode sets weighting factor values for applying to the first page size recommendation and the ruleset-based page size value when being combined to generate the page size;

performing, by the multi-tenant application, a first call to the external database using the page size; and performing, in a sequential manner by the multi-tenant application, the first call and a number of subsequent calls to the external database, wherein the number of subsequent calls is based on a first sequential request count recommendation.

11. The method of claim 10, further comprising:

generating the first page size recommendation based on a plurality of inputs, the plurality of inputs comprising at least a real-time status of a cloud platform and a subscription plan of a corresponding client; and training a machine learning engine with performance data of the cloud platform.

12. The method of claim 10, further comprising incrementing the fairness mode in response to detecting a first condition.

13. The method of claim 12, further comprising increasing a first weighting factor applied to the first page size recommendation in response to the fairness mode being incremented.

14. The method of claim 13, further comprising decrementing the fairness mode in response to detecting a second condition, wherein decrementing the fairness mode causes an increase to a second weighting factor applied to the ruleset-based page size value, and wherein decrementing the fairness mode causes a decrease to the first weighting factor.

15. The method of claim 14, wherein the first condition is detecting that a threshold number of clients are experiencing relatively low levels of throughput, and wherein the second condition is detecting that one or more clients with a premium subscription plan have a relatively large number of unprocessed jobs.

16. The method of claim 10, further comprising executing the multi-tenant application on a cloud platform.

17. The method of claim 16, further comprising dynamically generating the first page size recommendation and the first sequential request count recommendation for the first call to the external database in response to a scheduled job or a detected event, wherein the first page size recommendation and the first sequential request count recommendation are generated based on a subscription plan of a corresponding client, a real-time status of the cloud platform, and a real-time status of the external database.

18. A non-transitory computer-readable medium storing instructions, which when executed by at least one processor, cause operations comprising:

generating, by a multi-tenant application, one or more page size recommendations and one or more sequential request count recommendations for one or more calls to an external database;

combining a first page size recommendation with a ruleset-based page size value to generate a page size, wherein the page size specifies a number of records to retrieve from the external database;

determining in which fairness mode to operate in based on one or more conditions, wherein the fairness mode sets weighting factor values for applying to the first page size recommendation and the ruleset-based page size value when being combined to generate the page size;

performing, by the multi-tenant application, a first call to the external database using the page size; and performing, in a sequential manner by the multi-tenant application, the first call and a number of subsequent calls to the external database, wherein the number of subsequent calls is based on a first sequential request count recommendation.

19. A system, comprising:

at least one processor; and at least one memory including program instructions which when executed by the at least one processor causes operations comprising:

generating, by a multi-tenant application, one or more page size recommendations and one or more sequential request count recommendations for one or more calls to an external database;

performing, by the multi-tenant application, a first call to the external database using a page size which is based on a first page size recommendation, wherein the page size specifies a number of records to retrieve from the external database; and performing, in a sequential manner by the multi-tenant application, the first call and a number of subsequent calls to the external database, wherein the number of subsequent calls is based on a first sequential request count recommendation, wherein the first call and the number of subsequent calls are performed to the external database for a single client by the multi-tenant application without any intervening calls being made to the external database by the multi-tenant application for any other clients.

* * * * *